(12) United States Patent
Travis

(10) Patent No.: US 9,057,607 B2
(45) Date of Patent: Jun. 16, 2015

(54) LASER MEASURING DEVICE

(76) Inventor: Brian Phillip Travis, Danbury, CT (US)

( * ) Notice: Subject to any disclaimer, the term of this patent is extended or adjusted under 35 U.S.C. 154(b) by 13 days.

(21) Appl. No.: 13/558,385

(22) Filed: Jul. 26, 2012

(65) Prior Publication Data

US 2014/0026427 A1    Jan. 30, 2014

(51) Int. Cl.
  *G01C 15/04*  (2006.01)
  *G01C 9/18*   (2006.01)
  *G01C 15/00*  (2006.01)

(52) U.S. Cl.
  CPC ............. *G01C 9/18* (2013.01); *G01C 15/004* (2013.01)

(58) Field of Classification Search
  USPC .................. 33/286, 354, DIG. 21
  See application file for complete search history.

(56) References Cited

U.S. PATENT DOCUMENTS

| 6,073,353 | A  | * | 6/2000 | Ohtomo et al. | 33/281 |
| 6,167,630 | B1 | * | 1/2001 | Webb | 33/354 |
| 7,055,252 | B2 | * | 6/2006 | Wu | 33/286 |
| 2006/0064887 | A1 | * | 3/2006 | Chang | 33/286 |
| 2006/0168828 | A1 | * | 8/2006 | Dallman | 33/286 |
| 2013/0145635 | A1 | * | 6/2013 | Dallman | 33/286 |

* cited by examiner

*Primary Examiner* — G. Bradley Bennett
(74) *Attorney, Agent, or Firm* — Tobin Carberry O'Malley Riley & Selinger; Steven M McHugh

(57) ABSTRACT

A laser measuring device is provided and includes a device top, a device bottom, wherein the device bottom includes a first bottom surface and a second bottom surface, wherein the first bottom surface is in a first plane and the second bottom surface is in a second plane to form a ledge between the first bottom surface and the second bottom surface, a device front portion, a device rear portion, wherein the device rear portion defines a scribe channel, a plurality of leveling vials, wherein each of the plurality of leveling vials are located in a separate plane and a laser light source, wherein the laser light source is associated with the device front portion such that when the laser light source is activated, laser light is emitted from the device front portion and is aligned with the scribe channel.

7 Claims, 8 Drawing Sheets

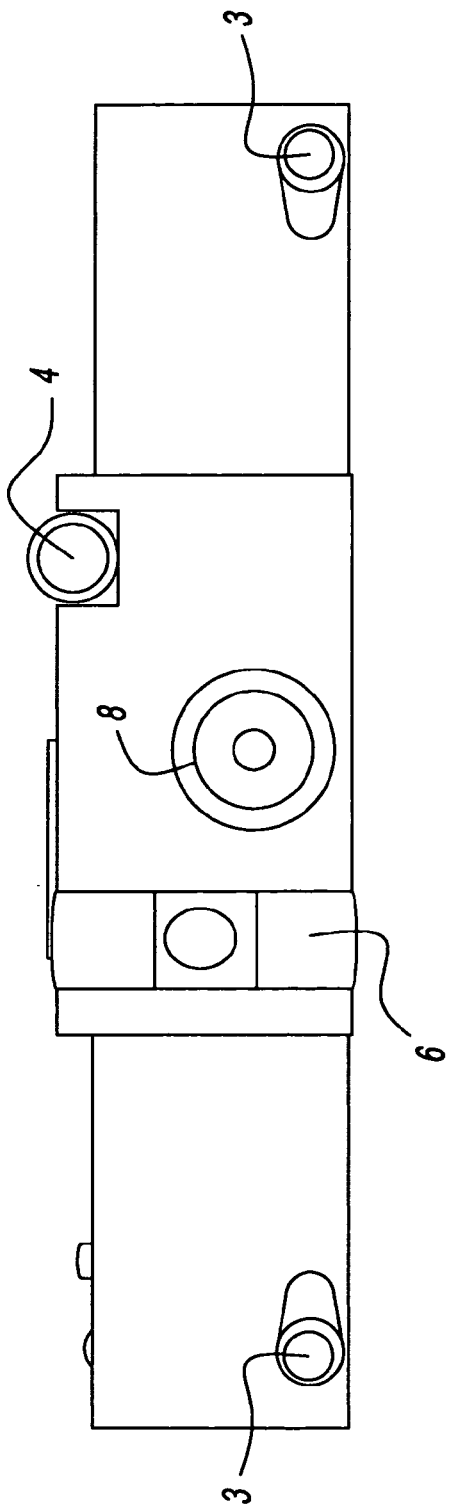
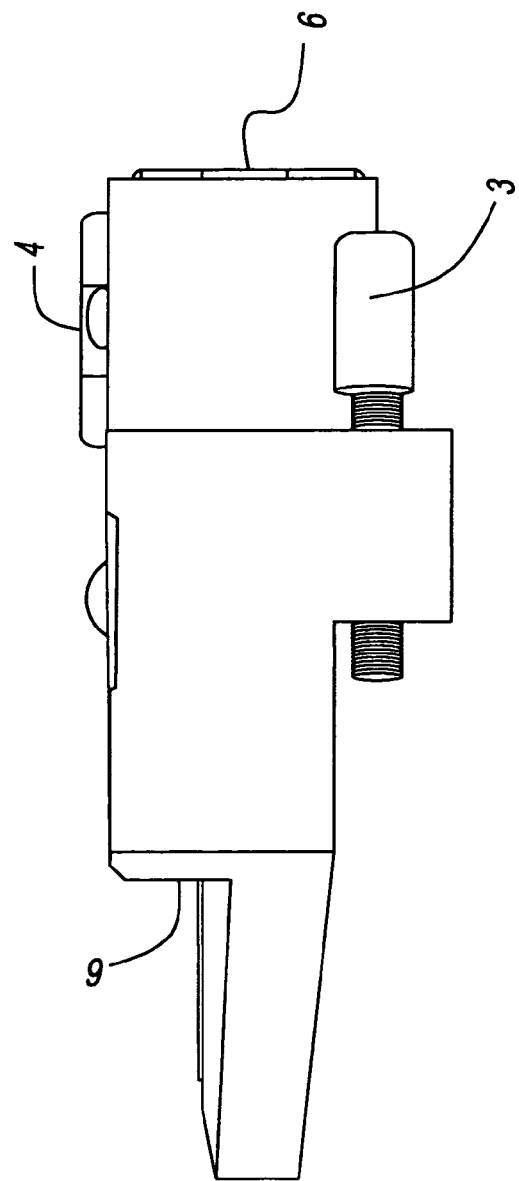
FIG. 3
FIG. 4

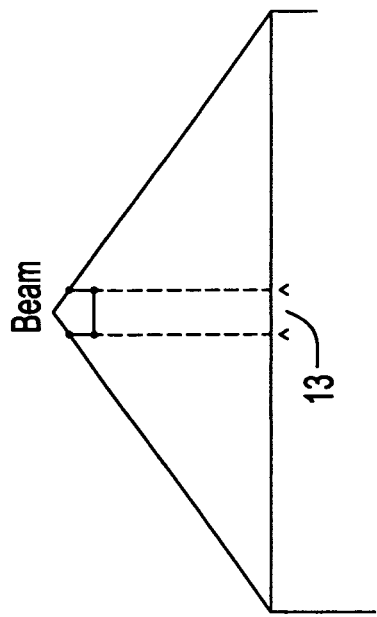
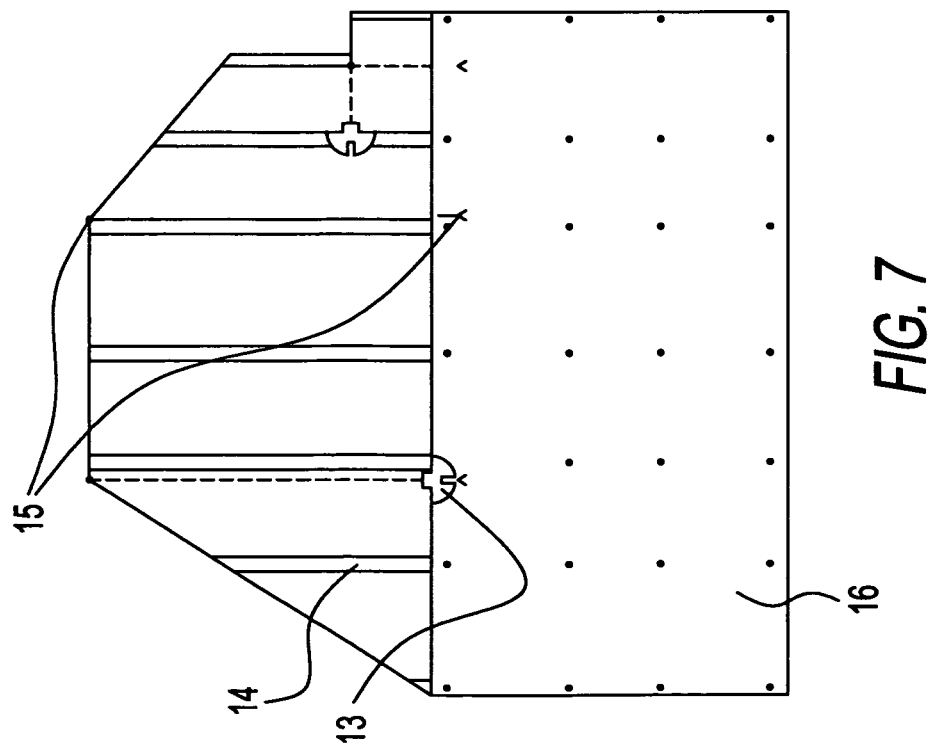
FIG. 8
FIG. 7

LASER MEASURING DEVICE

FIELD OF THE INVENTION

This invention generally relates to a laser measuring device for finding the intersecting points and peaks in the construction field generally used by carpenters and sheetrock installers

BACKGROUND OF THE INVENTION

Laser measuring devices are well known to the construction field and typically they are hand held or placed on a tripod, have at least one laser and at least one leveling vial. While being placed on a tripod assures stability moving it from destination to destination is quite time consuming. There is also the fact that most of these devices do not fit in the average tool belt or box.

Unfortunately, however in the field of a carpenter or sheetrock installer it is not efficient to set up a tripod for the laser every time there is a need to measure an intersecting point or a peak. Nor do current devices give you a scribing channel to mark the measurement. Previous devices and methods in this field have failed to adequately address the stability and true mark issues. Traditional designs have also failed to address the portability and ease of use this design may address all of these issues.

SUMMARY OF THE INVENTION

A laser measuring device is provided in accordance with one embodiment of the invention and includes a device top, a device bottom, wherein the device bottom includes a first bottom surface and a second bottom surface, wherein the first bottom surface is in a first plane and the second bottom surface is in a second plane to form a ledge between the first bottom surface and the second bottom surface, a device front portion, a device rear portion, wherein the device rear portion defines a scribe channel, a plurality of leveling vials, wherein each of the plurality of leveling vials are located in a separate plane and a laser light source, wherein the laser light source is associated with the device front portion such that when the laser light source is activated, laser light is emitted from the device front portion and is aligned with the scribe channel

BRIEF DESCRIPTION OF THE DRAWINGS

The foregoing and other features and advantages of the present invention will be more fully understood from the following detailed description of illustrative embodiments, taken in conjunction with the accompanying drawings in which like elements are numbered alike:

FIG. 3 is front view of the laser measuring device of FIG. 1.

FIG. 4 is a right side view of the laser measuring device of FIG. 1.

FIG. 7 illustrates the laser measuring device of FIG. 1 being used, in accordance with one embodiment.

FIG. 8 illustrates the laser measuring device of FIG. 1 being used, in accordance with another embodiment.

DETAILED DESCRIPTION OF THE INVENTION

Figure 1:
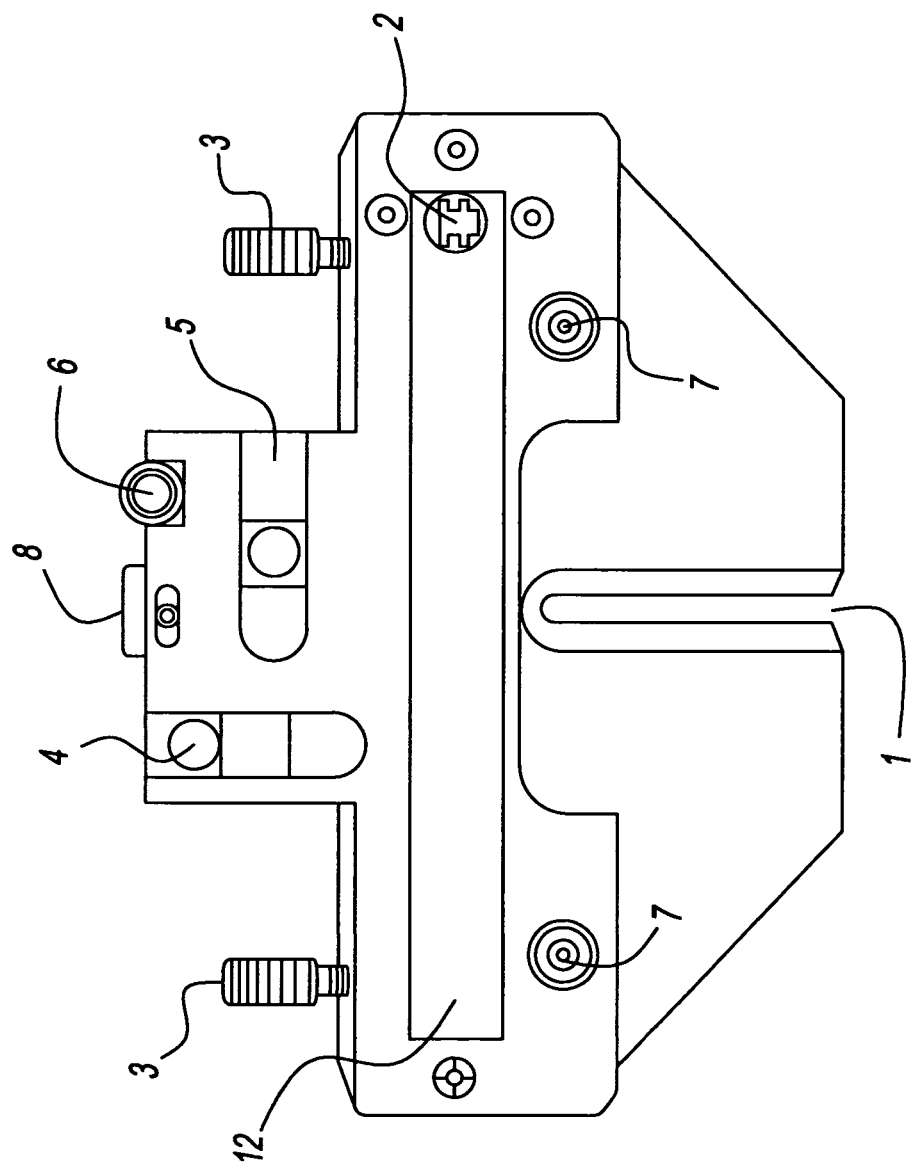
FIG. 1 is a top view of a laser measuring device, in accordance with one embodiment of the invention.

Referring to FIGS. 1-9, a laser measuring device is provided and may be configured as a vertical or horizontal laser measuring device, in accordance with one embodiment of the invention. Referring to FIG. 1, the laser measuring device (LMD) includes a scribing channel 1, two leveling screws 3, a plurality of leveling vials 4, 5, 6 and a laser 8. Additionally, the LMD also includes a bottom portion having a 90° right angle to form a ledge 9 that allows the laser measuring device to seat comfortably and stably on any panel board/platform (such as but not limited to wood, drywall/wall-board, tile) that has a 90° angle for the purpose of locating and marking hard to measure intersecting points and peaks. The ledge 9 may be placed on or against the panel/platform creating a very stable base therefore creating an environment where there may be no fluctuation in the measurement once the unit has been setup. If used horizontally it allows for hands free use as it rests on top of the panel/platform. The LMD also includes an on/off switch 2 and a battery compartment 12, where the on/off switch 2 allows the laser 8 to be turned on and off, as desired and the battery compartment 12 is configured to contain a power source (such as a battery) and includes a removable cover to secure the battery therein. It should be appreciated that the leveling screws 3 may be located at two points, one location being on one side of the LMD and the other location being on the other side of the LMD. As some studs or walls are not 100% straight, this advantageously allows a user to make sure that the LMD is level by allowing the user the ability to lower or raise each side of the LMD to make sure it is level.

To setup the unit the two leveling screws 3 (the LMD may have more or less leveling screws as desired) that are positioned in the front of the LMD (although the screws 3 may be located elsewhere on the LMD) and the three leveling vials 4, 5, 6 (the LMD may have more or less leveling vials as desired) are used to insures that the LMD is level to provide an accurate reading. The LMD also includes threaded holes 7 located in the top of the LMD to provide the capability to check if the panel or walls are plumb by placing the screws 3 in the threaded holes 7 and adjusting the screws 3 according to the leveling vials 4, 5, 6 on the LMD. It should be appreciated that threaded holes 7 and screws 3 (or nails that are small enough to fit through the threaded holes 7) can be used to secure the LMD to a stud or beam during use. The scribing channel 1 may be set directly behind the laser 8 to enable a user to mark out the intersecting point or peak assuring accuracy. The laser 8 is configured to form a line of laser light rather than a laser spot. As such, the line of laser light allows the laser 8 to be seen around corners making marking a boxed area easy and effective. Additionally, the LMD may be includes a battery compartment 12 and may be powered by a power source, such as two N Cell 3 volt batteries. It is contemplated that other power sources and/or battery voltages may be used as desired, such as AA, AAA or any other type of battery suitable to the desired end purpose. The size of the LMD makes it very convenient to use as it may fit into almost all tool belts or boxes and the LMD is unique due to the design of the ledge 9 and scribe channel 1. Moreover, the LMD is also highly portable and extremely accurate and may replace traditional methods of measurement that require bulky devices and setup time.

Referring to FIG. 2-FIG. 6, the ledge 9 is located on the bottom of the LMD and traverses the width of the LMD. This advantageously allows the LMD to rest flat on platform. It should be appreciated that the scribing channel 1 may have more than one function. For example, the scribing channel 1 can be used to place an accurate mark on a stud (for example a stud of generally 48 inches or less) to plumb the laser 8 turn it on and locate where the angles and slopes are in relation to the mark. This works well in stairwells for installation of drywall/wall-board. It is contemplated that the LMD is constructed from aluminum for lightness and durability, but the LMD may be constructed from plastic, rubber, etc. Moreover, although the 90° ledge 9 is shown as being located on the bottom of the LMD, the 90° ledge 9 may be located anywhere on the LMD as desired. It is also contemplated that during setup the LMD may be held in place (stationary) with one hand while the two screws 3 (which are located on either side of the laser 8) are adjusted responsive to the leveling vials 4, 5, 6. Additionally, the scribing channel 1 is located and configured to be aligned with and parallel to the line of laser light from the laser 8.

Figure 2:
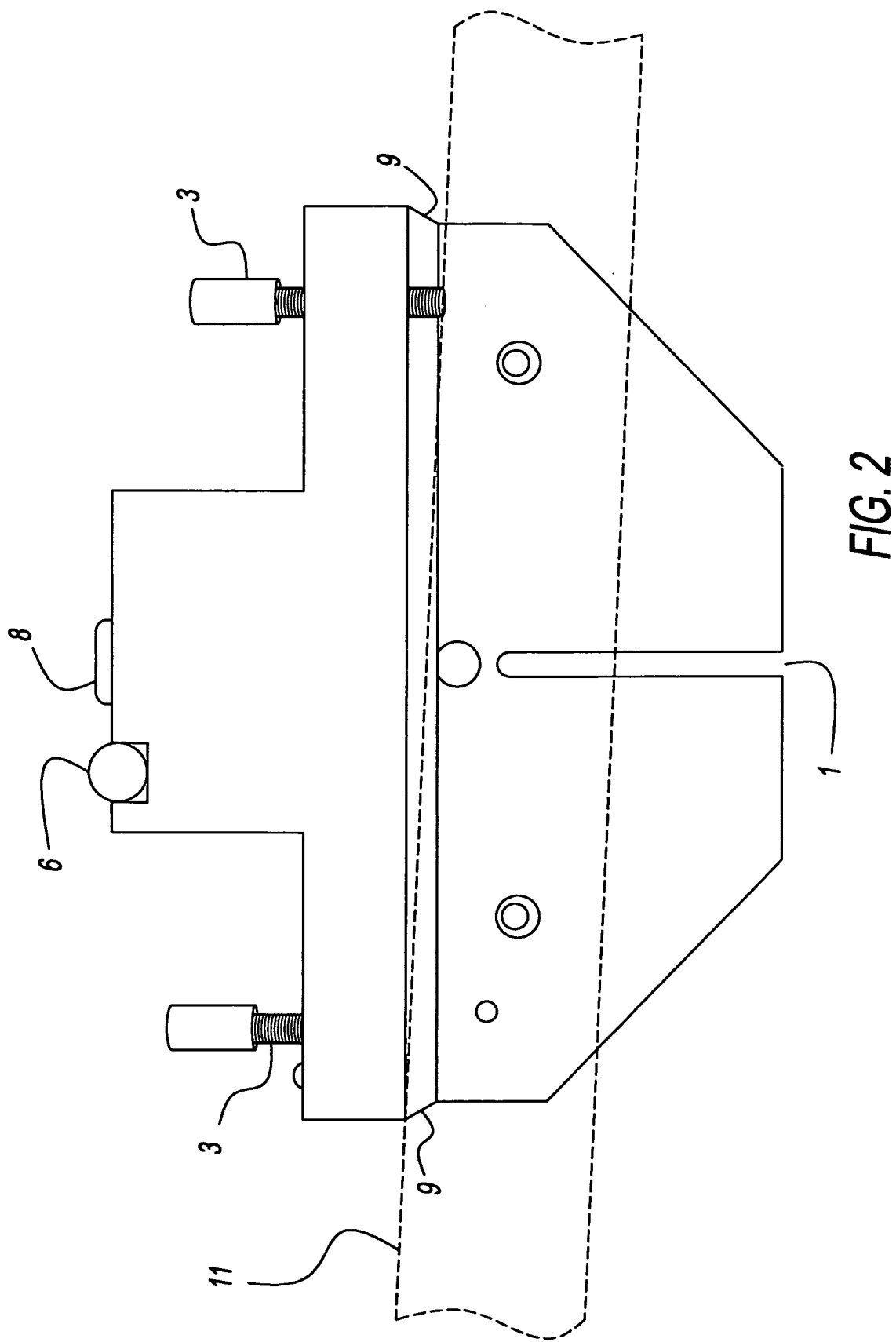
FIG. 2 is a bottom view of the laser measuring device of FIG. 1.
Figure 4A:
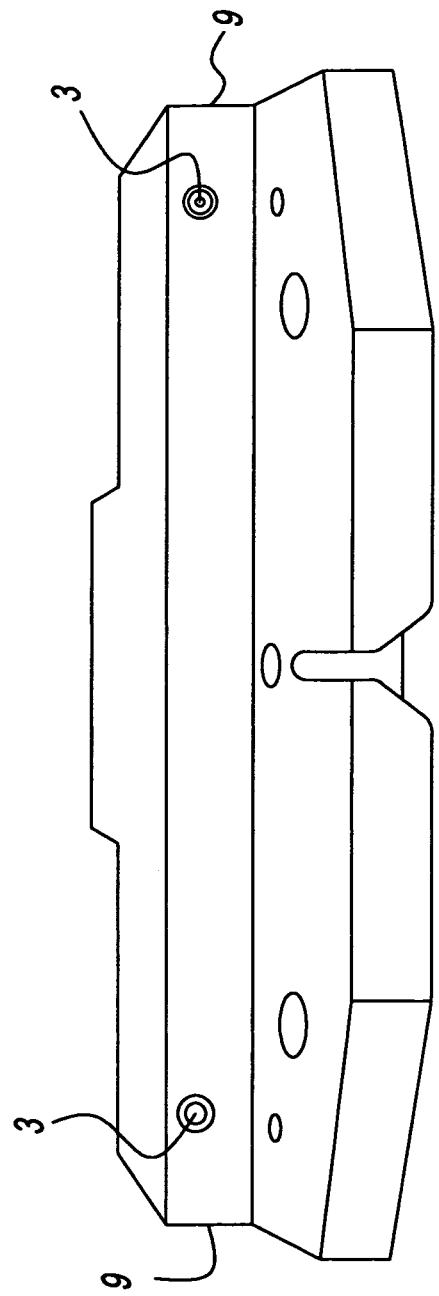
FIG. 4A is a front bottom view of the laser measuring device of FIG. 1.
Figure 5:
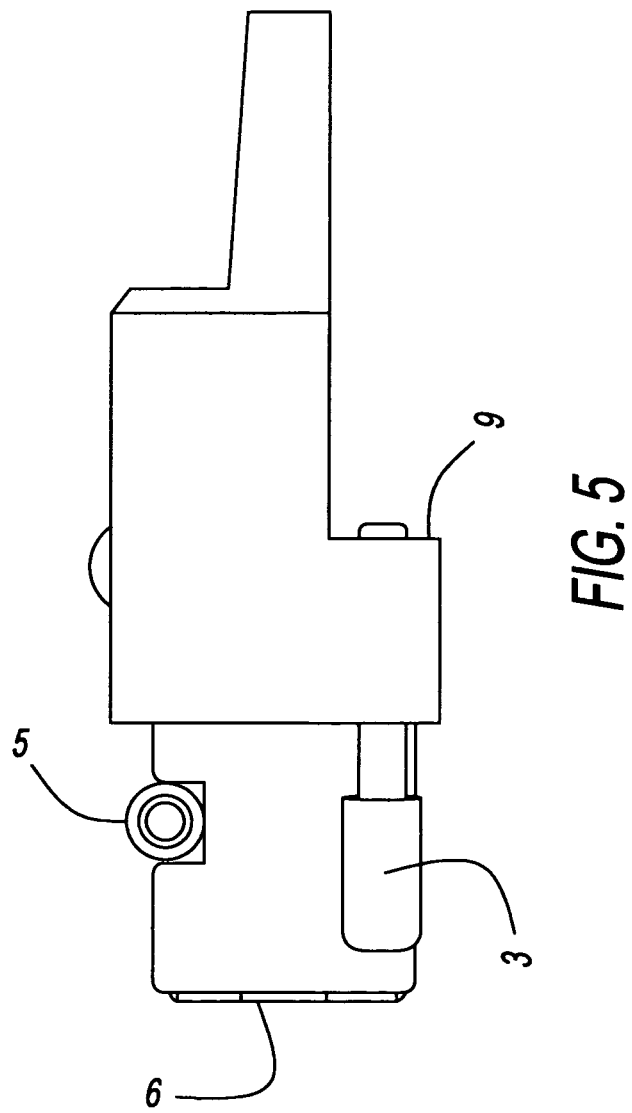
FIG. 5 is a left side view of the laser measuring device of FIG. 1.
Figure 6:
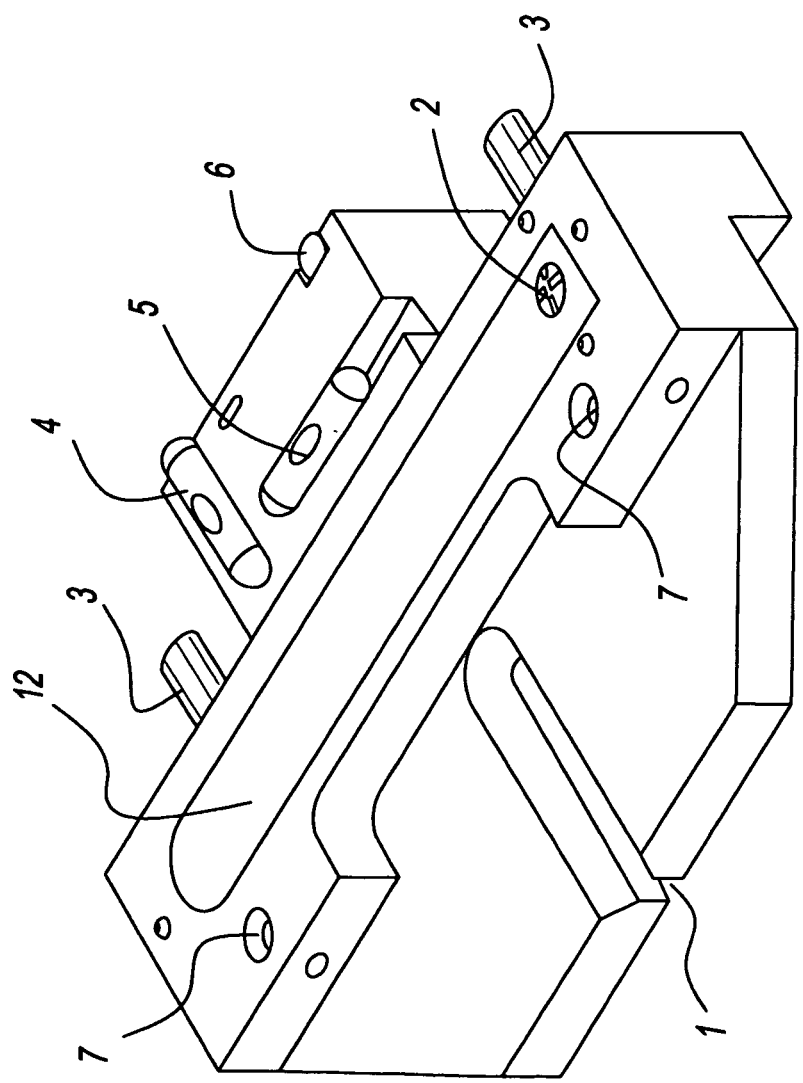
FIG. 6 is a front top down side view of the laser measuring device of FIG. 1.

Referring to FIG. 2, the LMD is shown associated with a non-level stud/beam 11 to illustrate that the LMD can be used with a non-level surface and that the screws 3 can be adjusted to level the LMD level relative to a reference. It should be appreciated that the leveling vials 4, 5, 6 allow a user to level the LMD in 3-dimensional planes.

It should be appreciated that in one embodiment, the LMD may be V shaped and constructed of aluminum, where a 90° ledge 9 is located on the bottom side of the LMD and extends across the center of the LMD. The LMD may include a scribing channel 1 located proximate the center of the bottom and top of the LMD. Additionally, the LMD may include two leveling screws 3, four threaded holes 7 (where the screws 3 can be moved between the holes 7) and where two are located on the front right side and front left side of the LMD and two are located on the right and left side of the top of the LMD. Furthermore, the LMD may include three leveling vials (for example, that are sized as 5/16 in×7/8 in) where one is located on the front of the LMD and the other two are located on the top of the LMD. Moreover, the LMD may also include an On/Off switch located on top side of the LMD and one (line not dot) three volt brass housed infrared optic and laser diode with an attached driver 635 nm 8 mm×13 mm, where the laser may be powered by two 1.5 volt batteries encased within the LMD located on the top side and secured with two screws.

Referring to FIG. 7, the LMD is shown in use with a structure and is located on a panel board or stud 14. The LMD is turned on and the laser 8 is emitting a line of laser light which is directed to the first intersecting point near the ceiling of the structure. Using a marking device, such as a pencil, the user would then make a first mark by drawing a line (or making a dot) using the scribing channel 1. This is repeated for the second intersecting point and a second mark is made by drawing a line (or making a dot) using the scribing channel 1. The distance between the first mark and the second mark is then measured and the cuts are made.

Referring to FIG. 8, the LMD is shown being used to locate a beam. In this case, a board is placed against the wall under the beam. The LMD is positioned and operated such that the laser light emitted from the laser 8 is pointing to the exact point of the side of the beam. A first mark is made using the scribing channel 1. The LMD is then positioned and operated such that the laser light emitted from the laser 8 is pointing to the exact point on the other side of the beam. A second mark is made using the scribing channel 1. The user may then cut out the space between the first and second marks and then slide the board up and secure it to the wall.

Figure 9:
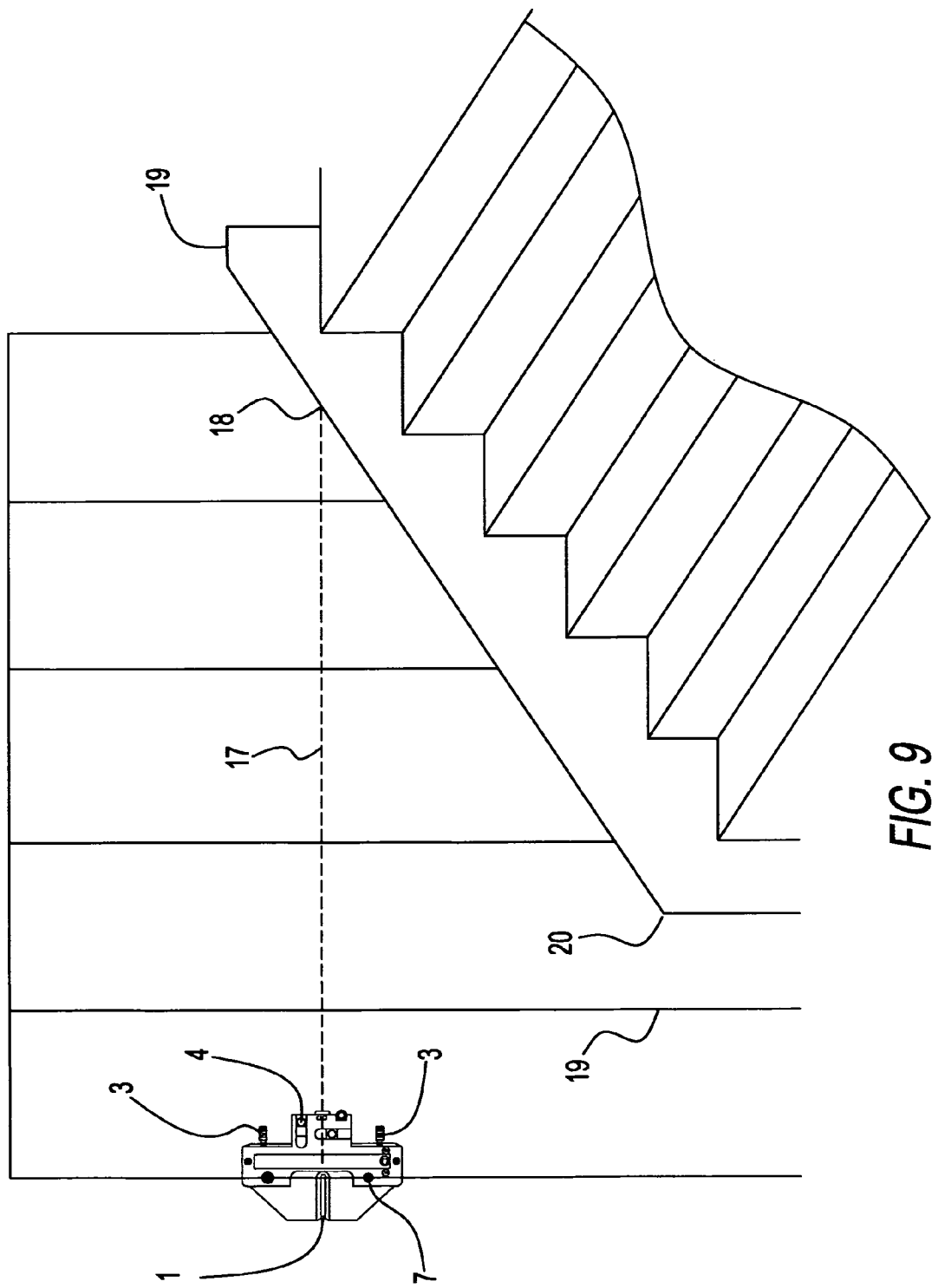
FIG. 9 illustrates the laser measuring device of FIG. 1 being used, in accordance with still yet another embodiment.

Referring to FIG. 9, in still yet another embodiment, the LMD may be used to install drywall/panel board. In this embodiment, since the panel board is typically about 48 inches high, a measurement is made upward from the floor of 48 inches and a first measurement mark representing the 48 inch height is made on a stud. The LMD is then associated with the stud such that the measurement mark is positioned within the scribe channel 1 and the LMD is adjusted using the positioning screws 3 to be plumb. The LMD is operated such that the laser light 17 is directed along a horizontal plane until the laser light 17 contacts the stair runner 19. A second measurement mark is made on the stair runner 19 at the point where the laser light 17 contacts the stair runner 19. This gives the user the up and over measurements needed to cut panel board to be used. After cutting the panel board is ready to be installed.

It should be appreciated that the LMD is specifically designed so that it may seat comfortably on any panel, be it horizontal or vertical, for the purpose of locating and marking difficult to measure intersecting points and peaks. An example would be beams that run across the width or length of a ceiling where you need to know where to make the cuts in the panel. In this case, the panel is placed against the wall and the LMD is placed on the top of the panel, activated and leveled. The line of laser light is directed to the left side of the beam and a first mark is made using the scribing channel 1. The line of laser light is directed to the right side of the beam and a second mark is made using the scribing channel 1. There is now an accurate spot to make the cut in the panel for the beam.

It should be appreciated that through a unique design, the invention advantageously provides a more stable means for obtaining accurate measurements and may provide a way to mark the measurement with a true straight line, where the invention is suitable for use within the residential and commercial construction industry. The invention advantageously may reduce material waste, increase productivity and provide accurate intersecting points to be marked for cuts. The scribing channel 1 which is located directly behind the laser 8 and extends approximately two (2) inches therefrom (but is not limited to these specific dimensions) is on the base below the ledge (but is not limited to this specific spot). This scribe channel 1 is designed so that it may exactly accommodate a marking device. For example, a construction pencil, a regular pencil or any writing implement suitable to the desired end purpose may be used. With its location directly behind the laser 8, the mark may always be straight and true therefore it will give a true mark as other traditional tools do not.

While the invention has been described with reference to an exemplary embodiment, it will be understood by those skilled in the art that various changes, omissions and/or additions may be made and equivalents may be substituted for elements thereof without departing from the spirit and scope of the invention. In addition, many modifications such as but not limited to (plastic, screws, ledge, overall size and production) may be made to adapt to a particular situation or material to the teachings of the invention without departing from the scope thereof. Therefore, it is intended that the invention not be limited to the particular embodiment disclosed as the best mode contemplated for carrying out this invention, but that the invention will include all embodiment falling within the scope of the appended claims. Moreover, unless specifically stated any use of the terms first, second, etc. do not donate any order or importance, but rather the terms first, second, etc. are used to distinguish one element from the other.

The invention claimed is:

1. A laser measuring device, comprising:
   a device top;
   a device bottom, wherein the device bottom includes a first bottom surface and a second bottom surface, wherein the first bottom surface is in a first plane and the second bottom surface is in a second plane to form a seating ledge between the first bottom surface and the second bottom surface;
   a device front portion;
   a device rear portion, wherein the device rear portion defines a scribe channel;
   a plurality of leveling vials, wherein each of the plurality of leveling vials are located in a separate plane; and
   a laser light source,
   wherein the laser light source is associated with the device front portion such that when the laser light source is activated, laser light is emitted from the device front portion and is aligned with the scribe channel.

2. The laser measuring device of claim 1, wherein the plurality of leveling vials include a first leveling vial, a second leveling vial and a third leveling vial.

3. The laser measuring device of claim 2, wherein the first leveling vial is associated with the device top and is configured to respond to a first plane, the second leveling vial is associated with the device top and is configured to respond to a second plane and the third leveling vial is associated with the device top and is configured to respond to a third plane.

4. The laser measuring device of claim 1, further comprising a battery compartment and an on/off switch, wherein the battery compartment is configured to contain one or more batteries and wherein the on/off switch is associated with both the battery compartment and the on/off switch to control power to the on/off switch.

5. The laser measuring device of claim 1, further comprising a plurality of threaded holes, wherein the plurality of threaded holes extend from the device front to the device rear to be associated with the seating ledge.

6. The laser measuring device of claim 5, further comprising a plurality of leveling screws, wherein the plurality of threaded holes and plurality of leveling screws are configured to threadingly engage such that the plurality leveling screws are threadingly contained within the plurality of threaded holes.

7. The laser measuring device of claim 6, wherein each of the plurality of leveling screws are configurable between a first configuration and a second configuration, wherein
   when in the first configuration the leveling screw is recessed into the threaded hole, and
   when in the second configuration the leveling screw extends from the threaded hole.

* * * * *